United States Patent
Cline et al.

(10) Patent No.: US 7,326,304 B2
(45) Date of Patent: *Feb. 5, 2008

(54) CONTROL OF THE PH IN WASHWATER RECOVERY SYSTEM FOR A GLASS FORMING LINE

(75) Inventors: Harry B. Cline, Heath, OH (US); William E. Downey, Granville, OH (US); Liang Chen, New Albany, OH (US); William R. Cooper, Johnstown, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/438,859

(22) Filed: May 23, 2006

(65) Prior Publication Data

US 2007/0000517 A1    Jan. 4, 2007

Related U.S. Application Data

(63) Continuation of application No. 10/160,842, filed on May 31, 2002, now Pat. No. 7,185,516.

(51) Int. Cl.
   *B08B 3/04* (2006.01)
(52) U.S. Cl. ............... 134/10; 134/56 R; 134/113; 134/111; 65/484
(58) Field of Classification Search ............ 134/56 R, 134/113, 94.1; 65/484
   See application file for complete search history.

(56) References Cited

U.S. PATENT DOCUMENTS 3,356,565 A * 12/1967 Smucker et al. ............ 162/199
3,738,868 A * 6/1973 Lancy ............................ 134/13
3,767,605 A * 10/1973 Gerlicher ..................... 523/334
3,791,807 A * 2/1974 Etzel et al. ................... 65/451
3,866,600 A * 2/1975 Rey ............................ 600/547
3,966,600 A    6/1976 Crowley et al.
3,978,506 A * 8/1976 Geyken et al. ............. 396/630
4,261,720 A    4/1981 Helbing
5,077,361 A   12/1991 Hughes et al.

(Continued)

FOREIGN PATENT DOCUMENTS

JP          09094598        8/1997

(Continued)

*Primary Examiner*—Frankie L. Stinson
(74) *Attorney, Agent, or Firm*—Inger H. Eckert; Maria C. Gasaway

(57) ABSTRACT

A neutralization system for controlling the pH of the washwater used to clean and maintain polyacrylic bound glass forming equipment is provided. The neutralization system introduces a base solution to a washwater solution when the pH of the washwater solution contained in a closed loop washwater recovery system and in a washwater tank holding the washwater solution is determined to be below approximately 8.0. Maintaining the pH of the washwater solution reduces the corrosion rate of the glass fiber forming equipment that is typically associated with acidic binders. In a second embodiment of the invention, a closed-loop hood-wall reclaim washwater recovery system utilized in addition to the washwater neutralization system that allows for the recovery and reuse of a polycarboxylic acid binder with a minimal amount of base solution. The closed-loop hoodwall reclaim washwater system is not connected to the closed-loop washwater neutralization system.

19 Claims, 2 Drawing Sheets

U.S. PATENT DOCUMENTS

| | | | |
|---|---|---|---|
| 5,294,686 | A | 3/1994 | Fiarman et al. |
| 5,318,990 | A | 6/1994 | Strauss |
| 5,340,868 | A | 8/1994 | Strauss et al. |
| 5,578,371 | A | 11/1996 | Taylor et al. |
| 5,646,207 | A | 7/1997 | Schell |
| 5,661,213 | A | 8/1997 | Arkens et al. |
| 5,670,585 | A | 9/1997 | Taylor et al. |
| 5,690,715 | A | 11/1997 | Schiwek |
| 5,718,728 | A | 2/1998 | Arkens et al. |
| 5,763,524 | A | 6/1998 | Arkens et al. |
| 5,770,555 | A | 6/1998 | Weinstein |
| 5,840,822 | A | 11/1998 | Lee et al. |
| 5,858,549 | A | 1/1999 | Kielbania, Jr. et al. |
| 5,866,664 | A | 2/1999 | McCallum, III et al. |
| 5,891,972 | A | 4/1999 | Egraz et al. |
| 5,932,109 | A * | 8/1999 | Griffin ..................... 210/709 |
| 5,932,665 | A | 8/1999 | DePorter et al. |
| 5,932,689 | A | 8/1999 | Arkens et al. |
| 5,977,224 | A | 11/1999 | Cheung et al. |
| 5,977,232 | A | 11/1999 | Arkens et al. |
| 6,136,916 | A | 10/2000 | Arkens et al. |
| 6,194,512 | B1 | 2/2001 | Chen et al. |
| 6,207,737 | B1 | 3/2001 | Schell et al. |
| 6,218,483 | B1 | 4/2001 | Muthiah et al. |
| 6,221,973 | B1 | 4/2001 | Arkens et al. |
| 6,241,780 | B1 | 6/2001 | Arkens et al. |
| 6,331,350 | B1 | 12/2001 | Taylor et al. |
| 6,454,873 | B1 * | 9/2002 | Mulligan et al. ............. 134/10 |
| 2003/0221457 | A1 | 12/2003 | Cline et al. |
| 2003/0221458 | A1 | 12/2003 | Cline et al. |

FOREIGN PATENT DOCUMENTS

| | | |
|---|---|---|
| WO | WO 99/61384 | 12/1999 |
| WO | WO 01/00699 | 1/2001 |

* cited by examiner

CONTROL OF THE PH IN WASHWATER RECOVERY SYSTEM FOR A GLASS FORMING LINE

CROSS REFERENCE TO RELATED APPLICATIONS

This application is a Continuation of U.S. patent application Ser. No. 10/160,842 entitled "Washwater Neutralization System For Glass Forming Line" filed May 31, 2002, now U.S. Pat. No. 7,185,516 the entire content of which is expressly incorporated herein by reference.

TECHNICAL FIELD AND INDUSTRIAL APPLICABILITY OF THE INVENTION

The present invention relates generally to washwater systems for glass forming lines, and, more particularly, to controlling the pH in a washwater recovery system for a fiberglass forming line.

BACKGROUND OF THE INVENTION

In the fiberglass industry, washwater systems remove excess binder from equipment used to form fiberglass insulation products. This binder removal allows the equipment to be operated at optimum efficiency to maximize glass throughput. Cleaning the equipment also reduces damage caused by the buildup of binder, thereby limiting the amount of downtime associated with equipment cleaning, repair, and replacement. The equipment includes items such as forming conveyors, forming hoodwalls, suction boxes, drop out boxes, and forming fans.

Polycarboxylic acid based fiberglass binder resins are commonly used in the glass industry for insulation applications. Polycarboxylic acid based binders can provide advantages in terms of mechanical properties and decreased reliance on environmental control equipment.

One problem with currently available washwater systems is that by using a polyacrylic acid binder, the acidity of the reclaim water increases with the number of cleaning cycles. This acidic reclaim water may corrode the supporting structure and washwater equipment, which is typically made of carbon steel, thereby limiting the equipment's useful life. This acidity in the reclaimed water can also result (1) in added manufacturing costs due to equipment replacement and downtime and (2) in decreased efficiency in the glass manufacturing process which may result in increased manufacturing costs associated with rework and the like.

Various solutions have been attempted to address this corrosion problem. For example, stainless steel can be used to replace the carbon steel in the forming and washwater equipment due to its resistance to corrosion. However, stainless steel equipment is expensive relative to carbon steel equipment.

Another proposed solution is to decrease the number of cycles that reclaim water is passed through the forming equipment. However, this solution leads to increased costs in terms of water usage and wastewater removal and decreases the efficiency of the forming equipment associated with replacing the reclaim water.

It is thus highly desirable to improve the corrosion resistance of forming equipment and washwater equipment.

SUMMARY OF THE INVENTION

The present invention reduces the corrosion rate of glass forming and washwater equipment by controlling the pH of the washwater used to clean the equipment and wash the uncured polyacrylic binder and fiberglass from the equipment to approximately 8.0 or above.

To reduce the corrosion rate of the equipment, a washwater neutralizing system is introduced within the closed loop washwater recovery system to ensure that the washwater is maintained at pH of 8 or above (i.e., the pH is maintained at a pre-set value of 8 or more). To maintain the pH, a pH probe is coupled to the inside of a washwater holding tank to monitor the pH of the washwater. For example, if the pH is measured by the probe at or below 8.0 (e.g., at or below the pre-set value), a pump introduces base solution, preferably a hydroxide solution, to the washwater tank until the pH is raised to at least about 8.0. The addition of a base solution ensures that the reclaimed washwater used to wash the uncured binder and fibers from the equipment is maintained at a pH that limits or reduces the corrosion of the equipment. This reduction in the corrosion of the equipment increases the useful life of the forming equipment and decreases manufacturing costs associated with repair and replacement of forming equipment due to the acid corrosion.

In a preferred embodiment, a closed-loop hoodwall reclaim washwater system is introduced in addition to the washwater reclaim system (closed loop washwater recovery system). The hoodwall washwater recovery system pumps washwater from a separate washwater tank to remove excess polyacrylic acid binder from the hoodwalls of the forming area. Alternatively, the washwater may be used as makeup water for preparing subsequent batches of the aqueous binder. The closed-loop hoodwall washwater recovery system is not coupled to the washwater neutralizing system. Therefore, the washwater that is reclaimed in the closed-loop hoodwall washwater recovery system is substantially free of base solution. In addition, the reclaimed washwater may be returned to a binder makeup tank for reuse, thereby reducing binder costs. Further, because the recovered binder is substantially free of base solution, bound fiberglass containing the recovered binder experiences better and more consistant curing compared to binders having a small amount of base solution, as even small amounts of base solution within the binder may inhibit the curing of the binder. Also, bound fiberglass products that contain binders that are substantially free of base solution have decreased degradation rates associated with water absorption caused by the presence of polyacrylic acids salts and a decreased degradation of the product that affects insulating properties such as recovery, stiffness, and R-value. The hoodwall washwater recovery system minimizes or reduces the amount of base solution in the binder makeup tank, thereby reducing potential curing problems associated with the presence of a base solution in the product. hoodwall washwater recovery system also increases the amount of recoverable binder, thereby decreasing binder costs.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

DETAILED DESCRIPTION AND PREFERRED EMBODIMENTS OF THE INVENTION

Figure 1:
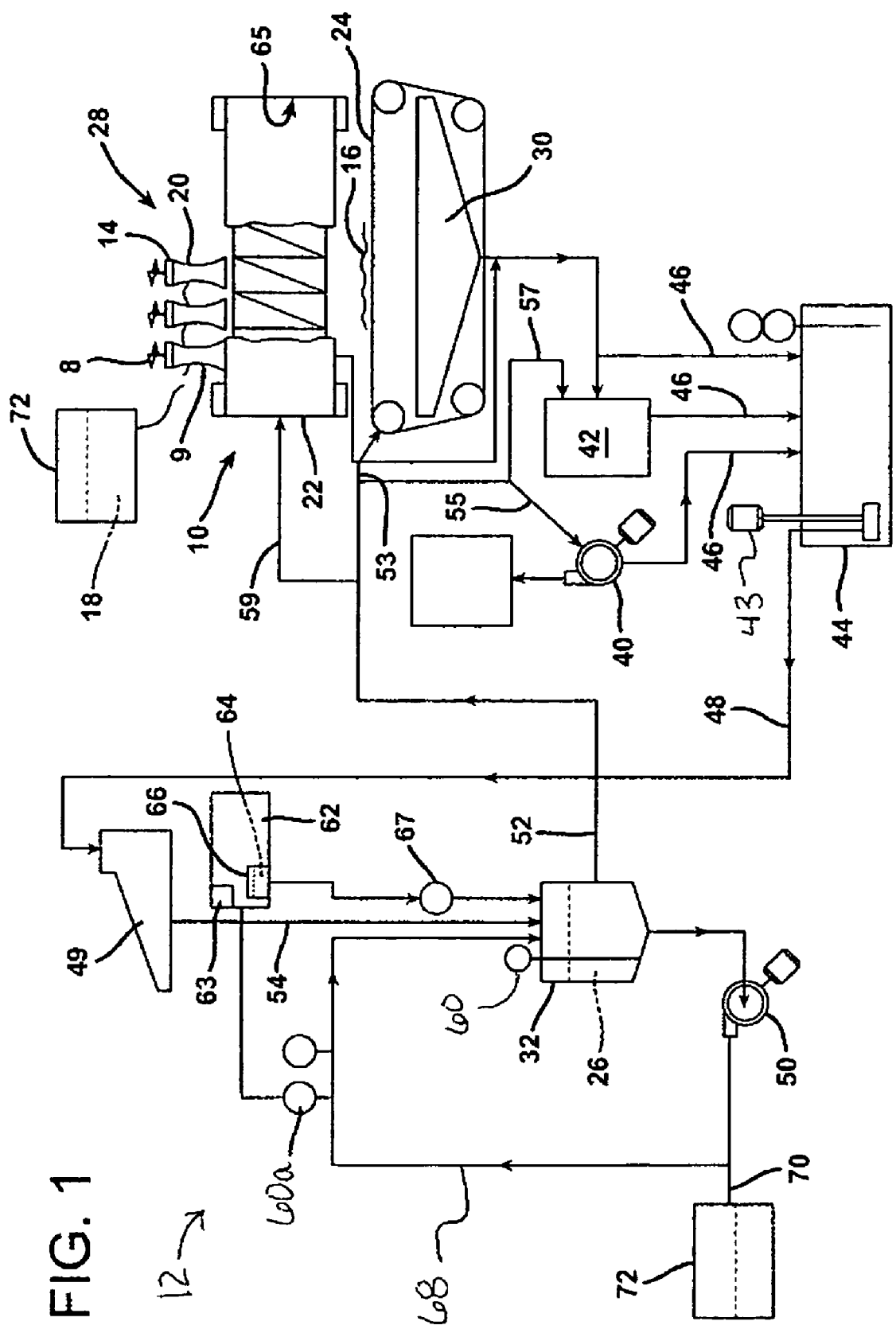
FIG. 1 is a schematic illustration of a fiberglass forming line having a closed-loop washwater recovery system according to at least one embodiment of the present invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references. In the drawings, the thickness of the lines, layers, and regions may be exaggerated for clarity. It is to be noted that like numbers found throughout the figures denote like elements.

The polycarboxylic acid binder is preferably a polyacrylic acid binder and may be formed from polyacrylic acids and crosslinking groups such as glycerol and triethanolamines. Examples of suitable binders for use in the present invention are disclosed in U.S. Pat. No. 6,933,349 to Chen et al. entitled "Low Odor Insulation Binder from Phosphite Terminated Polyacrylic Acid", filed Mar. 21, 2001; U.S. Patent Publication No. 2002/0188055 to Chen et al. entitled "Surfactant-Containing Insulation Binder", filed May 31, 2001; and U.S. Pat. No. 6,194,512 to Chen et al. entitled "Corrosion Inhibiting Composition for Polyacrylic Acid Based Binders", filed Jun. 28, 1999, each of which is incorporated herein by reference in their entireties. A brief description of each of these exemplary binders is set forth below. In the present invention, the binder is diluted with water to a preferred application viscosity of between approximately 3 to 25% solids.

In U.S. Pat. No. 6,933,349 to Chen et al., a binder composition is obtained by polymerizing an acrylic acid monomer in water in the presence of a cure accelerator to form a low molecular weight polyacrylic acid. The low molecular weight polyacrylic acid preferably has a weight-average molecular weight ranging from 1,000-10,000, and even more preferably from 2,000-6,000. The molar ratio of hydroxyl groups in the polyhydroxy crosslinking agent to carboxylic acid groups in the polyacrylic acid may range from 0.4 to 0.6. The low molecular weight polyacrylic acid is then reacted with a polyhydroxy crosslinking agent in a crosslinking step to make a composition that is suitable for use as a binder for fiberglass. Once a composition suitable for use as a binder is produced, it may be diluted with sufficient water to provide a binder mixture having up to 98 wt.-% water, preferably about 50-60 wt.-% water. It is to be appreciated that the crosslinking step is conducted in the absence of added catalyst. In addition, satisfactory results are obtained with this binder in the absence of undesirable sulfur odors.

Preferred classes of cure accelerators used to form the binder composition disclosed in U.S. Pat. No. 6,933,349 are alkali metal salts of phosphorous acid, hypophosphorous acid, and polyphosphoric acids. Non-limiting examples of such salts include sodium hypophosphite, sodium phosphite, potassium phosphite, disodium pyrophosphate, tetrasodium pyrophosphate, sodium tripolyphosphate, sodium hexametaphosphate, potassium phosphate, potassium polymetaphosphate, potassium polyphosphate, potassium tripolyphosphate, sodium trimetaphosphate, and sodium tetrametaphosphate. Mixtures of two or more of these salts may be used. Particularly preferred cure accelerators are sodium hypophosphite, sodium phosphite, and mixtures thereof. Suitable examples of the polyhydroxy crosslinking agent include triethanolamine, glycerol, trimethylolpropane, 1,2,4-butanetriol, ethyleneglycol, 1,3-propanediol, 1,4-butanediol, 1,6-hexanediol, pentaerythritol, sorbitol, and mixtures thereof. Preferably, the crosslinking agent is either triethanolamine or glycerol. Additional components such as a hydrolyzed silane coupling agent and/or a mineral oil dust suppressing agent may be included in the binder mixture.

U.S. Patent Publication No. 2002/0188055 to Chen et al. teaches a fiberglass insulation binder composition that includes a polycarboxy polymer, a polyhydroxy crosslinking agent, and at least one surfactant (i.e., cationic surfactants, amphoteric surfactants, nonionic surfactants, and mixtures thereof). The surfactant acts as a surface tension reducing agent and reduces the surface tension of the polycarboxy polymer binder composition, thereby enabling a great improvement in binder wetting, atomization, and distribution of the binder into the fiberglass matrix over previous binder compositions. Thus, the polycarboxy binder composition provides better fiber protection, less fiber damage, better product performance, and a more environmentally friendly manufacturing operation.

The primary solids component of the polycarboxy binder composition of U.S. Patent Publication No. 2002/0188055 is preferably acrylic acid, but may be any polycarboxy polymer. The binder composition includes an organic polymer or oligomer containing a plurality of pendant carboxy groups. The polycarboxy polymer may be a homopolymer or copolymer prepared from unsaturated carboxylic acids including, but not limited to, acrylic acid, methacrylic acid, crotonic acid, isocrotonic acid, maleic acid, cinnamic acid, 2-methylmaleic acid, itaconic acid, and 2-methylitaconic acid. Alternatively, the polycarboxy polymer may be prepared from unsaturated anhydrides including maleic anhydride, itaconic anhydride, acrylic anhydride, methacrylic anhydride, and mixtures thereof. Methods for polymerizing these acids and anhydrides are well known in the chemical arts and will not be described in detail herein. The polymerization results in a low molecular weight polycarboxy polymer.

In forming the polycarboxy binder of U.S. Patent Publication No. 2002/0188055, the low molecular weight polycarboxy polymer, a polyhydroxy crosslinking agent, and a surfactant are mixed together, such as in a conventional mixing device. Water may be added to the solids mixture in an amount necessary to produce an aqueous binder that has a viscosity and flow rate suitable for application to glass fibers forming a fibrous glass mat. Typically, water is added in an amount up to about 98% by weight of the binder. Non-limiting suitable examples of crosslinking agents for use in forming the polycarboxy binder composition include triethanolamine, glycerol, trimethylolpropane, ethyleneglycol, 1,3-propanediol, 1,4-butanediol, 1,6-hexanediol, pentaerythritol, 1,2,4-butanetriol, and sorbitol. It is to be noted that no catalyst is necessary in the crosslinking reaction between the polycarboxy polymer and the polyhydroxy crosslinking agent. Additionally, additives such as a hydrolyzed silane coupling agent and/or a mineral dust suppressing agent may be added to the mixture.

Another example of a binder that may be used in the present invention is described in U.S. Pat. No. 6,194,512 to Chen et al. In particular, Chen et al. teach an aqueous co-binder derived from an aqueous co-binder composition that includes an extended phenolic binder and a polycarboxylic acid binder. A phenolic resole resin may be prepared by a method in which phenol is methylolated by a suitable aldehyde. A preferred aldehyde is formaldehyde. An initial charge of phenol is mixed with an excess of formaldehyde. It is desirable that the aldehyde:phenol molar ratio is about 2:1 to about 6:1. The methylolation reaction takes place under alkaline conditions, which may be achieved by adding an effective amount of an alkaline methylolation catalyst. The methylolation catalyst preferably includes an organic base and an inorganic base. The organic base may be selected from functionalized hydroxy-groups containing organic bases, such as alkanolamines. Preferably, the organic base is a tertiary alkanolamine, such as triethanolamine, 2-dimethylamino-2-hydroxymethyl-1,3-propanediol (DMTA), or combinations thereof. The organic base preferably constitutes 0 to about 10% by weight based on the initial charge of phenol.

The inorganic base component of the methylolation catalyst may be any inorganic base, such as an alkali metal hydroxide. A preferred alkali metal hydroxide is sodium hydroxide. The inorganic base may be present in any amount effective to catalyze methylolation of phenol. Preferably, about 5 to about 10% by weight of an inorganic base based on the initial charge of phenol is used. The methylolation may take place at a temperature of less than 150° F., preferably at about 120° F. to about 135° F. Most preferably, methylolation occurs at about 125° F. The exothermic reaction mixture is heated for a sufficient period of time to reduce the amount of free phenol to a desired level, preferably not more than 0.35 wt. %. The phenolic resole resin is extended and excess aldehyde is consumed by the addition and reaction of an aldehyde scavenger with the phenolic resole resin. The aldehyde scavenger reacts with at least some, and preferably most, of the excess aldehyde present in the phenolic resole resin after the methylolation reaction. The preferred formaldehyde scavenger is urea. Other suitable aldehyde scavengers include melamine, dicyandiamide, methylol melamine, methylol urea, and other compounds identifiable to those skilled in the art.

As noted above, the binder curing reaction proceeds under acidic conditions. Accordingly, the inorganic base and organic base employed in the methylolation step to achieve the desired speciation is preferably neutralized. Neutralization of the base catalyst may be achieved through a combination of polycarboxylic acid polymers having pendant acid groups and a latent acid catalyst, such as ammonium sulfate. An effective amount of a polycarboxylic acid polymer having at least one pendant carboxylic acid group, such as polyacrylic acid, is preferably combined with the phenolic substituents. It is desirable that the polycarboxylic acid polymer is combined with the phenolic constituents before any aqueous binder is applied to the glass fibers. The polycarboxylic acid polymer may be combined with the phenolic constituents, for example, after formation of the resole resin, after formation of the reaction pre-mix, or immediately prior to application of the aqueous co-binder solution to the glass fibers. The amount of polycarboxylic acid polymer combined with the phenolic constituents may range from about 0 to about 50% by weight, preferably from about 2 to about 15% by weight, and more preferably, from about 5 to about 10% by weight, based on the total resin solids. The ratio of pendant carboxylic acid groups to hydroxy groups provided by the organic base described above is preferably about 1.4 to about 2.5. More preferably, the ratio of pendant carboxylic acid groups to hydroxy groups is about 2.0 to about 2.5. It is preferred that the total number of acid equivalents provided by the polycarboxylic acid polymer does not exceed the total number of base equivalents provided by the combination of the inorganic base and organic base catalyst.

Various conventional additives such as silane, oil emulsion, and dyes may be added to the reaction pre-mix before or after the polycarboxylic acid polymer is combined with the phenolic constituents. The aqueous co-binder may be applied to glass fibers in any conventional manner, such as spraying the aqueous co-binder directly onto the formed glass fibers. In addition, the aqueous co-binder may be cured by any conventional manner, such as by passing the binder-coated fibers through a curing oven.

FIG. 1 illustrates a fiberglass forming line that includes a closed-loop washwater recovery system 12 according to one embodiment of the present invention. As depicted in FIG. 1, fiberglass is formed on a forming line 28 in a multi-step process. First, molten glass is introduced from a furnace (not shown). The molten glass then passes through a bushing 8 to a spinner 14 that forms a plurality of fibers 9 in a method well-known to those of skill in the art. A water-based polycarboxylic acid binder 18 (e.g., a polyacrylic acid binder) from a binder make-up tank 72 is sprayed onto the fibers 9 by a plurality of spaced nozzles (not shown) contained on a binder ring 20 to coat the fibers 9 with uncured binder 18.

As shown in FIG. 1, the fibers 9 are introduced into a forming section 10 that includes a hoodwall 22 that confines the fibers 9. The walls 65 of the hoodwall 22 include a continuous moving belt that contains the fibers 9 and any oversprayed binder 18 within the forming section 10. The binder coated fibers 9 are gathered onto a forming conveyor 24 by pulling a large volume of air across a series of perforated plates (not shown) on the conveyor 24 with the assistance of a forming fan 40. Once gathered, the binder coated fibers 9 form an uncured fiberglass pack 16 on the forming conveyor 24. A drop out box 42 slows the velocity of air circulating between the conveyor 24 and the forming fan 40 so that binder coated fibers 9 and droplets (not shown) formed from the polycarboxylic acid binder 18 that may pass through the forming conveyor 24 are substantially prevented from reaching the forming fan 40. The binder-coated fiberglass pack 16 is moved along the conveyor 24 to an oven (not shown) for subsequent curing and processing to form glass fiber insulation products. The method for introducing the binder 18, forming the fiberglass insulation pack 16, and subsequent formation of fiberglass insulation products such as batts, rolls, blowing wool, and board products from the insulation pack 16 is well-known in the art.

The walls 65 of the hoodwall 22 are washed with a washwater solution 26 that is introduced from a washwater tank 32 via a pump 50 through inlet line 52. The washwater solution 26 removes excess binder 18 from the walls 65 of the hoodwall 22. Excess binder 18 and washwater solution 26 are then collected in sump 44 and returned to the washwater tank 32 via pump 43.

The washwater solution 26 is introduced separately via input lines 53, 55, 57, 59 to remove excess binder 18 from the suction box 30, the forming fan 40, the drop out box 42, and the forming hoodwall 22, respectively. Separately adding the washwater 26 to the equipment ensures that the equipment has clean surfaces and achieves optimal performance. The washwater solution 26 is then gathered from the suction box 30, the drop out box 42, the fan 40, the forming hoodwall 22, and the conveyor 24 and deposited into a washwater sump 44 via lines 46. Next, the sump 44 pumps the washwater solution 26 which contains glass fibers 9, partially cured particles of binder 18, and excess uncured binder 18 through outlet line 48 to a shaker screen 49 where the glass fibers 9 and partially cured particles of binder 18 are removed. The remaining washwater solution 26 containing the excess binder 18 is returned to the washwater tank 32 by line 54.

The washwater tank 32 contains one or more pH probes 60 that provide electrical feedback to a processor 63 of a neutralization system 62. In addition, at least one pH probe 60a is coupled to a binder extraction line 68 to measure the pH of the washwater 26 within the extraction line 68. The pH probe(s) 60, 60a measures the pH of the washwater solution 26 and generates electrical signals that are interpreted by the processor 63 of the neutralization system 62. The electrical signal generated from each of the pH probes 60, 60a represents the pH of the washwater solution 26 in the washwater tank 32 and the binder extraction line 68 respectively. When the pH of the washwater solution 26 is determined to be less than approximately 8.0, the processor 63 of the neutralization system 62 introduces a quantity of a base solution 64 into the washwater tank 32 from a holding tank 66 by a pump 67. The holding tank 66 may be contained within the neutralization system 62 or it may be externally coupled to the neutralization system 62. The addition of base solution 64 from the holding tank 66 of the neutralization system 62 ensures that the washwater solution 26 pumped through the closed-loop washwater recovery system 12 is maintained at a pH that will not corrode (or minimize corrosion of) the forming conveyor 24, suction boxes 30, forming fan 40, drop out box 42, duct work (not shown) and environmental equipment (not shown).

Preferably, the base solution 64 is a weak acid/strong base salt that is soluble in water and can neutralize the washwater solution 26 without the production of insoluble salts. Further, the base solution 64 should not buffer the washwater solution 26 to an extent that the washwater solution 26 may not be able to be removed from the washwater tank 32 and used to prepare phenolic binders. The base solution 64 may be solid sodium hydroxide or a solution formed from any available concentration of sodium hydroxide, calcium hydroxide, or ammonium hydroxide, but is preferably a 50% by weight solution of sodium hydroxide dispersed in water. It is to be appreciated that calcium hydroxide has limited solubility in water. As a result, insoluble salts tend to settle out of the calcium hydroxide solution, which may cause potential pluggage problems. Additionally, ammonium hydroxide undesirably releases ammonia.

Other weak acid/strong base salts such as sodium bicarbonate may be used as the base solution 64. However, these salts are not preferred because it is likely that they will buffer the washwater solution 26 to an extent that the washwater solution 26 may not be able to be removed from the washwater tank 32 and used to prepare phenolic binders.

The reclaimed washwater solution 26 containing the binder 18 may be siphoned from the washwater tank 32 through a binder extraction line 68 and placed into a binder makeup tank 72 via line 70. Here, the binder 18 may be extracted (recovered) from the reclaimed washwater solution 26 and reused in the application process. This recycling of the binder 18 may reduce both binder costs and manufacturing costs associated with making insulation products.

Figure 2:
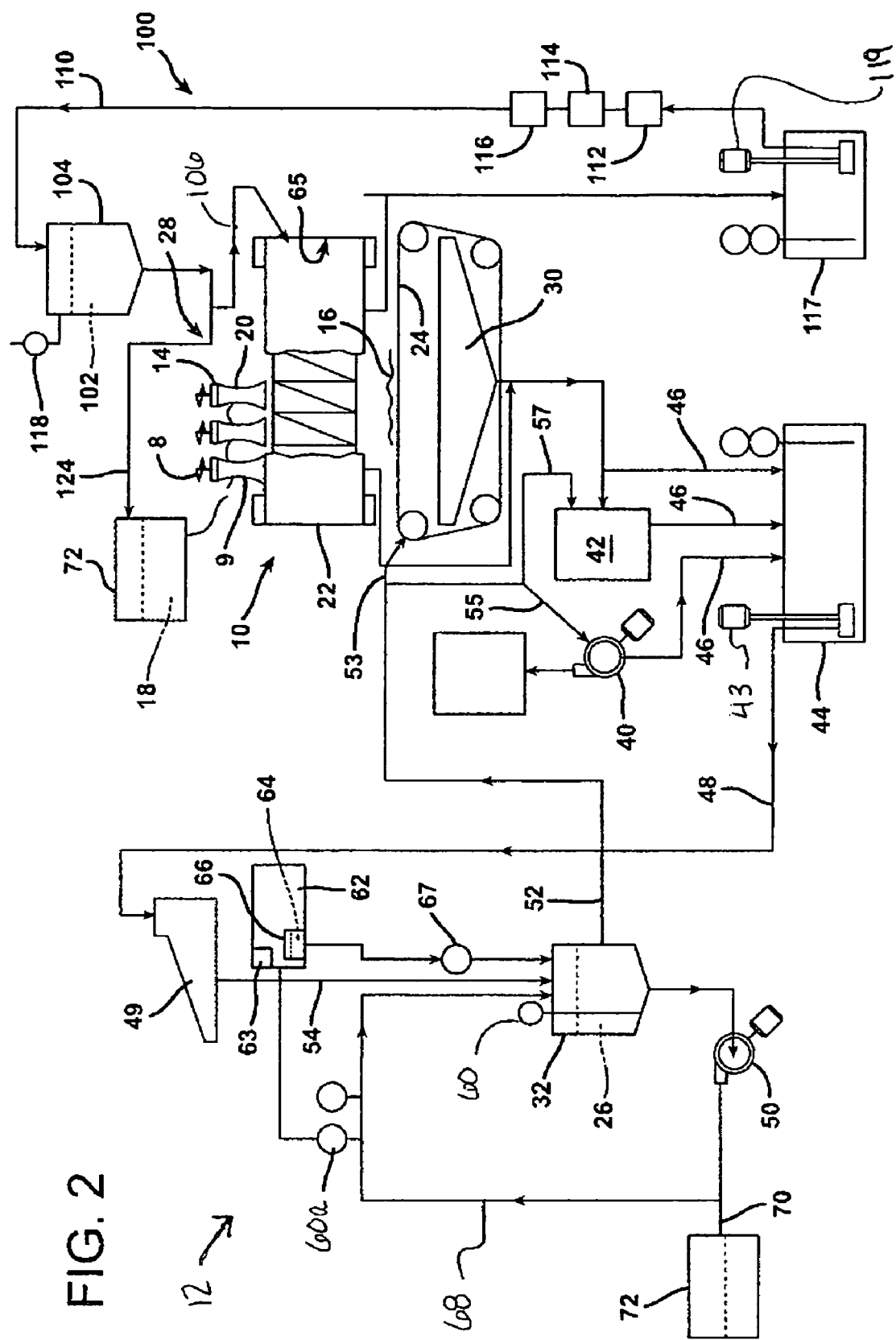
FIG. 2 is a schematic illustration of a fiberglass forming line having a closed-loop washwater recovery system and a closed-loop hoodwall washwater recovery system according to at least one other embodiment of the present invention.

In a second embodiment illustrated in FIG. 2, input line 59, which supplied washwater solution 26 to the walls 65 of the forming hoodwall 22 of FIG. 1, is replaced with a closed-loop hoodwall washwater recovery system 100. It is to be appreciated that the closed-loop hoodwall washwater recovery system 100 is not connected to the closed-loop washwater recovery system 12 depicted in FIG. 1. In the closed-loop hoodwall washwater recovery system 100, a washwater solution 102 is introduced from a hoodwall reclaim recirculation tank 104 through a line 106 to the walls 65 of the forming hoodwall 22 to remove excess binder 18 such as binder that may have accumulated on the walls 65 during the glass forming process. Excess binder 18 and washwater solution 102 is then returned to the recirculation tank 104 via sump 117 and pump 119 through line 110 after passing through a series of filtering devices such as a filter 112, a shaker screen 114, and/or a centrifuge 116. A combination of a filter 112, a shaker screen, and a centrifuge is depicted in FIG. 2. The filter 112, shaker screen 114, and/or centrifuge 116 removes glass fibers and suspended partially cured particles of binder 18 from the reclaimed (used) washwater solution 102 prior to the reintroduction of the washwater 102 into the recirculation tank 104. Water may be introduced by a pump 118 to the hoodwall reclaim circulation tank 104 to replace water lost during the glass forming and recirculation processes. It is desirable that all wetted parts of the hoodwall reclaim washwater system 100 are either stainless steel or contain a corrosion resistant material.

The reclaimed washwater solution 102 containing binder 18 may be siphoned from the tank 104 through line 124 and placed into a binder makeup tank 72. Because the binder 18 is a water-based binder as described above, the binder 18 and washwater solution 102 may be reused in the application process. This recirculation of the binder 18 reduces binder costs, thereby minimizing manufacturing costs that are associated with making fiberglass insulation products.

The addition of a second closed-loop hoodwall washwater recovery system 100 offers several advantages. For example, the second system 100 increases the amount of recoverable binder 18. Further, the binder 18 that is recovered is substantially free of the base solution 64. This is an important aspect of the invention because the base solution 64 adversely affects the curing of the reclaimed binder 18 used in glass fiber products if the base 64 is not removed.

In addition, by minimizing the amount of base solution 64 in the insulation pack 16, the amount of polyacrylic acid salt contained in the finished insulation product made from the insulation pack 16 is also minimized. This is also an important aspect of the present invention because the polyacrylic acid salt increases the potential for water absorption within the finished insulation product, and water absorption may lead to an increase in a degradation of the insulation properties of the finished insulated product during storage and subsequent use.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A method for controlling the pH of washwater in washwater lines used to clean glass forming equipment comprising:

removing washwater from a washwater tank used to reclaim used washwater containing a polyacrylic binder from glass forming equipment;

passing said washwater through a closed loop binder extraction line including at least one pH probe coupled to said line;

measuring the pH of said washwater in said line;

comparing said measured pH to a pre-set value; and adding a quantity of base solution if said measured pH is below said pre-set value, wherein said base solution is soluble in water and neutralizes said washwater without the production of insoluble salts.

2. The method of claim 1, wherein said measuring step comprises:

directing an electrical signal from said at least one pH probe to a neutralization system including a holding tank containing said quantity of base solution and a processor, said electrical signal representing the pH of said washwater.

3. The method of claim 2, wherein said adding step comprises:

introducing said quantity of base solution from said holding tank in an amount sufficient to raise said measured pH of said washwater to at least said pre-set value, said pre-set value being approximately 8.0.

4. The method of claim 3, wherein said base solution is an hydroxide solution added as a function of said electrical signal.

5. The method of claim 2, wherein said measuring step is conducted after binder is extracted from said washwater before being returned to said washwater tank.

6. The method of claim 2, further comprising:

coupling a second pH probe in said washwater tank to monitor the pH of said washwater in said washwater tank;

measuring the pH of said washwater in said washwater tank by said second pH probe;

comparing said pH of said washwater in said washwater tank to said pre-set value; and adding a quantity of base solution from said holding tank in response to the pH of said washwater as determined by said second pH probe if said pH of said washwater in said washwater tank is below said pre-set value.

7. The method of claim 1, wherein said closed loop extraction line interconnects a first portion of said washwater tank to withdraw said washwater from said washwater tank and a second portion of said washwater tank to return said washwater to said washwater tank.

8. A method for controlling the pH of washwater in a binder makeup tank in a system utilized for cleaning glass forming equipment comprising:

determining the pH of washwater in a closed loop binder extraction line including at least one pH probe, said closed loop binder extraction line in flow communication with a washwater tank to pass washwater containing a polycarboxylic acid binder removed from glass forming equipment from said washwater tank and return said washwater to said washwater tank, said binder extraction line including a binder makeup tank for extracting said binder from said washwater;

comparing said determined pH to a pre-set value;

adding a quantity of base solution to said washwater if said determined pH is below said pre-set value to raise the pH of said washwater to at least said pre-set value;

introducing said washwater from said washwater tank into said binder makeup tank;

coupling a second pH probe in said washwater tank to monitor the pH of said washwater in said washwater tank;

measuring the pH of said washwater in said washwater tank by said second pH probe;

comparing said pH of said washwater in said washwater tank to said pre-set value; and adding a quantity of said base solution from said holding tank in response to the pH of said washwater as measured by said second pH probe if said pH of said washwater in said washwater tank is below said pre-set value.

9. The method of claim 8, further comprising a pH probe positioned within said washwater tank to measure the pH of said washwater solution in said washwater tank.

10. The method of claim 8, wherein said determining step is conducted downstream from said binder makeup tank and before said washwater tank.

11. The method of claim 8, wherein said determining step comprises:

electrically coupling said at least one pH probe to a processor;

directing an electrical signal from said at least one pH probe to a neutralization system including a processor and a holding tank containing said quantity of base solution, said electrical signal representing the pH of said washwater.

12. The method of claim 11, wherein said adding step comprises:

introducing said quantity of base solution from said holding tank in an amount sufficient to raise said measured pH of said washwater to at least said pre-set value.

13. The method of claim 12, wherein said pre-set value is 8.0.

14. The method of claim 11, wherein said base solution is an hydroxide solution added as a function of said electrical signal.

15. A washwater recovery system to reclaim washwater containing an acid binder removed from glass forming equipment comprising:

a washwater tank retaining a supply of reclaimed washwater;

a closed loop binder extraction line in flow communication with said washwater tank to remove reclaimed washwater from said washwater tank and return said reclaimed washwater to said washwater tank;

at least one pH probe positioned in said closed loop binder extraction line to measure the pH of said reclaimed washwater; and a washwater neutralization system coupled to said at least one pH probe to introduce a quantity of base solution into said reclaimed washwater in response to said measured pH, wherein said washwater neutralization system includes a processor and a holding tank containing a quantity of base solution, said processor being coupled to said at least one pH probe to receive an electrical signal therefrom representing the pH of said reclaimed washwater, said processor directing the release of said base when the pH of said reclaimed washwater is interpreted by said processor to be less than approximately 8.0.

16. The washwater recovery system of claim 15, wherein said binder extraction line further includes a binder makeup tank for extracting binder from said reclaimed washwater.

17. The washwater recovery system of claim 16, wherein said at least one pH probe is located downstream of said binder makeup tank to measure the pH of said reclaimed washwater after binder has been extracted therefrom.

18. The washwater recovery system of claim 17, wherein said base solution includes a hydroxide base that is soluble in water and will neutralize said reclaimed washwater without the production of insoluble salts.

19. The washwater recovery system of claim 15, further comprising a second pH probe coupled to said washwater tank to measure the pH of said reclaimed washwater in said washwater tank.

* * * * *